June 17, 1958 J. T. BANKS 2,838,803
ROTATING ROLL BOX FOR COTTON GINS
Filed Jan. 31, 1956 2 Sheets-Sheet 1
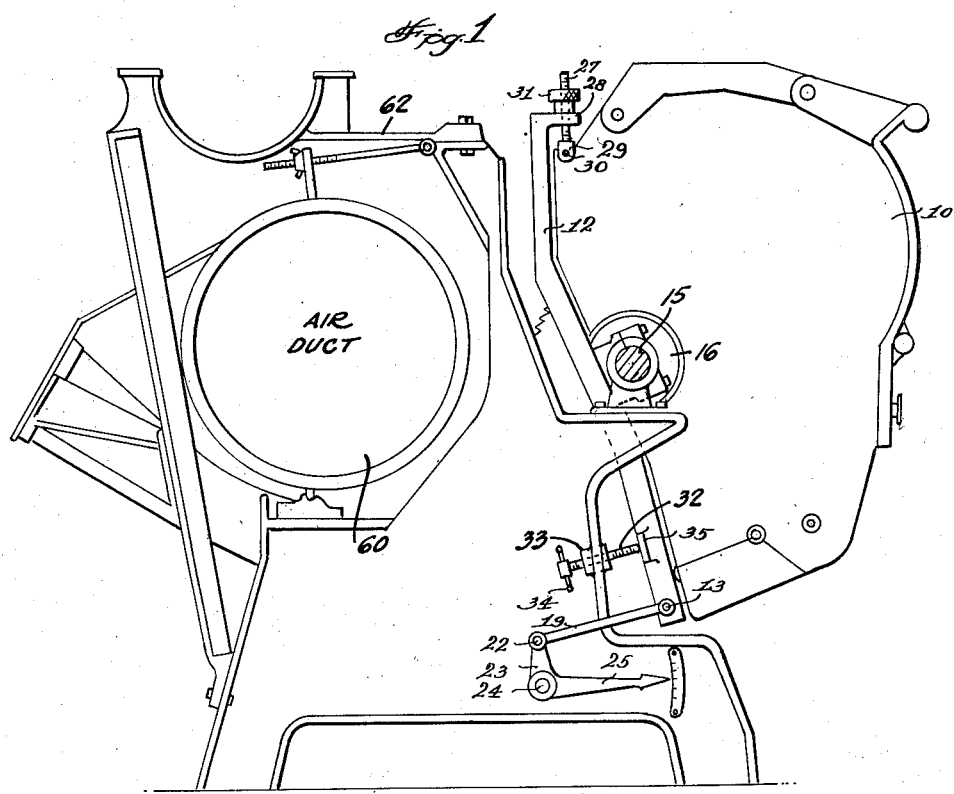
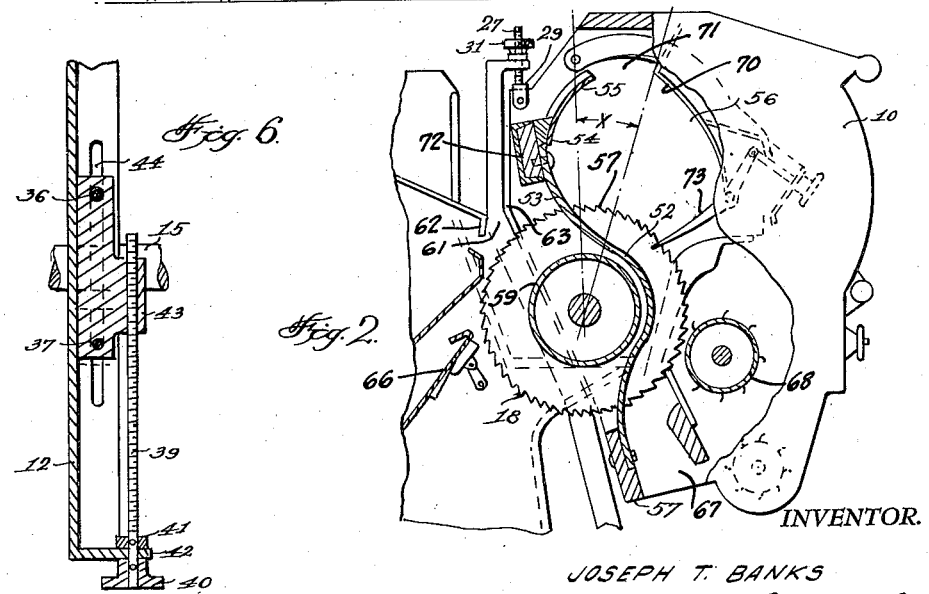
INVENTOR.
JOSEPH T. BANKS
BY Victor J. Evans & Co.
ATTORNEYS

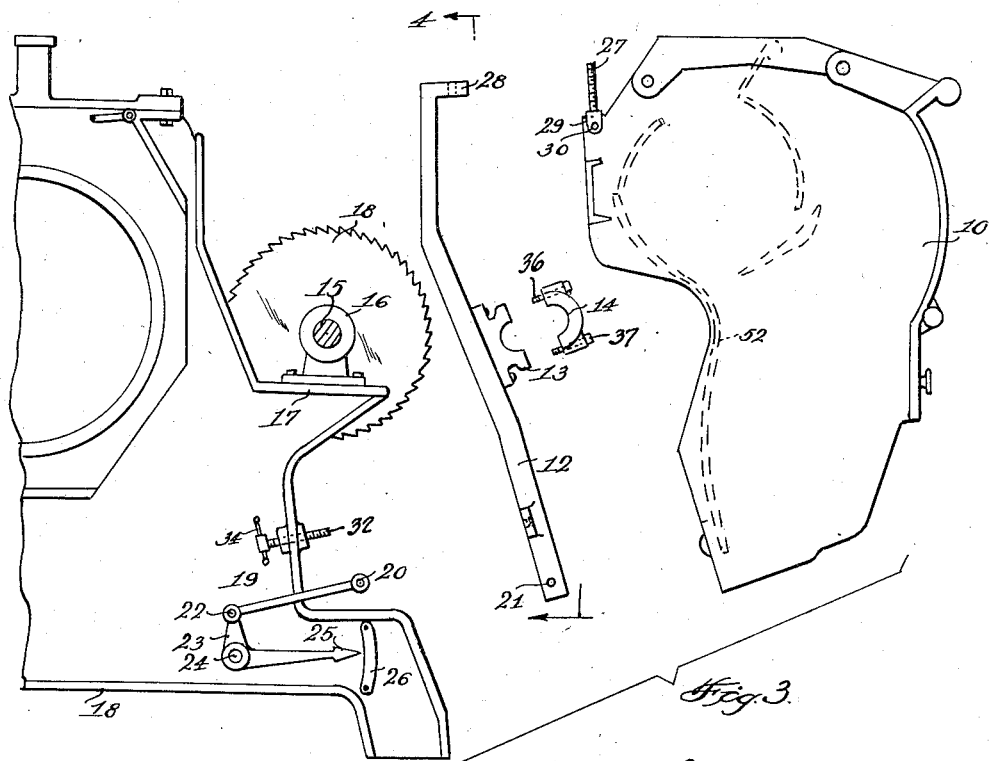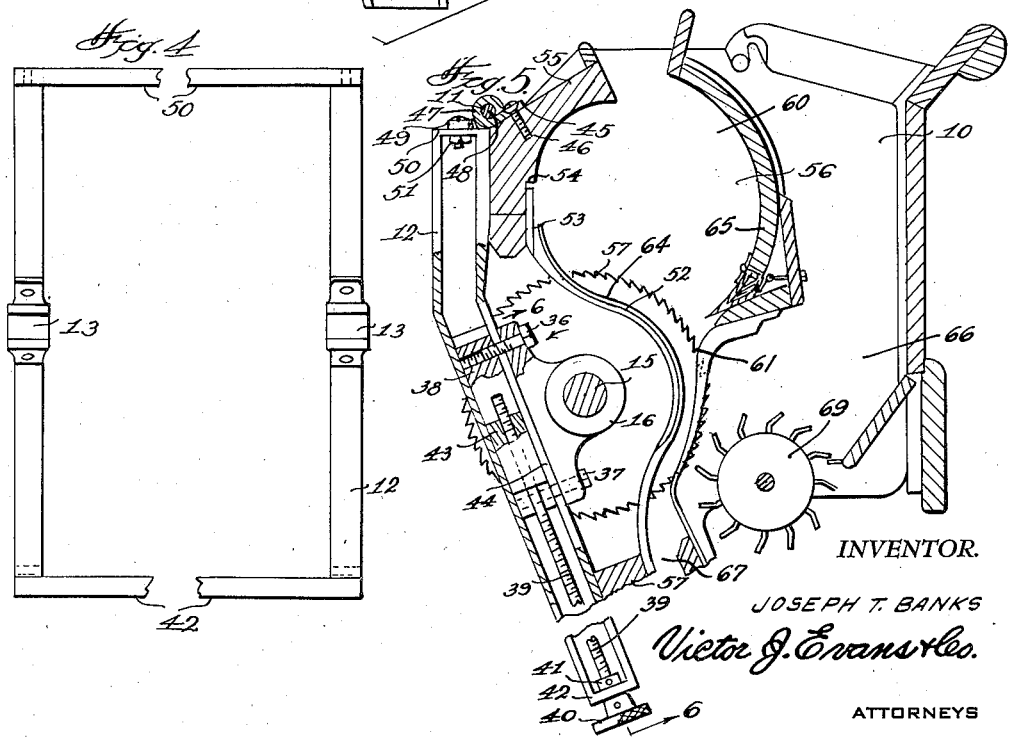

2,838,803
ROTATING ROLL BOX FOR COTTON GINS

Joseph T. Banks, New York, N. Y.

Application January 31, 1956, Serial No. 562,555

6 Claims. (Cl. 19—55)

This invention relates to cotton gins, or linter gins, whereby an attachment in the form of an intermediate frame is installed between the main gin frame and the gin breast and mounted to swing pivotally around the axis of the saw cylinder whereby the gin breast may travel in a curved path with either a fixed or variable radius from the center of the saw cylinder shaft.

The main object of this invention is to expedite cotton ginning capacity and to obtain more efficient type of work by providing means for varying the penetration of the saws of a cotton gin or linter gin into the roll of cotton in the roll box whereby the roll of cotton is adapted to be moved toward or away from the saws continuously with the gin in operation, and also whereby the angle of balance between the center of the roll box and a vertically disposed plane extended through the axis of the saw cylinder may be increased or decreased to compensate for the different requirements of cotton ginned on the machine.

Various methods have been employed for attempting to expedite cotton ginning without detriment to the quality of lint cotton being turned out or the cleanliness of the cotton seed. However, owing to varying characteristics of cotton grown in different localities it is difficult, if not impossible, to standardize the relative positions of the saw cylinder and roll box. Although various adjustments have been provided in cotton gins for making some changes in the relative positions of the saw cylinder and the roll box, such devices are not applicable to a cotton gin in operation. With this thought in mind this invention contemplates a cotton gin or linter gin having a gin breast pivotally mounted around the saw shaft whereby a roll box positioned in the breast may be moved toward and away from the saw cylinder and in a curvilinear path around the saw cylinder to regulate the penetration of the saws into the roll box and the angle of balance between the center of the roll box and the vertical plane from the center of the saw cylinder.

The object of this invention is, therefore, to provide means for mounting the gin breast of a cotton ginning machine whereby the roll box is adapted to swing in relation to the saw cylinder thereby providing means for controlling the penetration of the saws into the roll of cotton, and the angle of balance between roll box and saw cylinder.

Another object of the invention is to provide an improved mounting of a gin breast of a cotton gin on the frame of the gin to regulate the penetration of the saws into the roll of cotton and the angle of balance between the roll box and saw cylinder in which the device is adapted to be incorporated in cotton gins now in use.

A further object of the invention is to provide an improved cotton gin having a gin breast mounted on an intermediate frame which is pivotally mounted around the center of the saw shaft and fastened adjustably to the main gin frame to provide means for regulating penetration of the saws into the roll of cotton and the angle of balance between the roll box and saw cylinder in which the machine is of a simple and economical construction.

With these and other objects and advantages in view the invention embodies a cotton gin frame having an air pipe or duct extended longitudinally through the upper part thereof, a saw cylinder including a plurality of rotatable circular saws mounted on a shaft, said saws being in spaced relation, means for rotatably mounting the shaft on which the saws are positioned on the frame of the gin, and a gin breast, pivotally mounted at the upper or lower end on an intermediate swingable frame rotatable around the center of the saw cylinder shaft, and positioned whereby a roll box with cotton therein is adapted to move along a curvilinear path with the radius from the center of the saw cylinder so that the angle of balance may be increased or decreased.

Other features and advantages of the invention will appear from the following description taken in connection with the drawing, wherein:

Figure 1 is an end elevation view illustrating the improved cotton gin.

Figure 2 is a view somewhat similar to that shown in Fig. 1, showing a cross section through parts of the cotton gin, with parts broken away and other parts shown in elevation, the angle of balance being shown in broken lines.

Figure 3 is an exploded view showing an end section of the cotton gin frame with one of the saws mounted thereon, an intermediate frame mounted to rotate around center of saw shaft, and a gin breast positioned on the intermediate frame.

Figure 4 is an elevation view taken on line 4—4 of Fig. 3 showing the intermediate frame assembly.

Figure 5 is a longitudinal section through the gin with parts omitted and other parts broken away showing a modification in which the intermediate frame is provided with adjusting means and in which the gin breast is hinged to the upper end of the intermediate frame.

Figure 6 is a vertical section through the gin taken on line 6—6 of Fig. 5, also with parts omitted and other parts broken away, showing means for adjusting the intermediate frame on the saw cylinder.

Referring now to the drawing wherein like reference characters denote corresponding parts, the improved cotton gin of this invention includes a gin breast 10 which may be pivotally mounted at the top, as shown in Figs. 1 and 5, or at the bottom, and which as shown in the modification shown in Fig. 5, is mounted by hinges 11 on the upper end of the intermediate gin frame 12, the intermediate frame 12 being pivotally mounted by bearings 13 having caps 14 on a shaft 15 of the saw cylinder, the travel of the intermediate frame being concentric with the axis of the shaft, and the shaft 15 being rotatably mounted by bearings 16, on sections 17 of the gin frame 18. The intermediate frame, with the gin breast 10 thereon is rotated by a link 19 which is connected at one end, to the intermediate frame with a pin 20 in an opening 21 in the frame, and at the opposite end by a pin 22 to an arm 23 of a bell crank pivotally mounted by a pin 24 on the gin frame and having a pointer 25 that is positioned to coact with a graduated scale 26 extended from the hub and which controls the rocking movement of the intermediate frame and in breast.

In the design shown in Fig. 1 the gin breast is suspended by bolts 27 from ears 28 extended from the upper end of the intermediate frame 12, yokes 29 on the lower ends of the screws being pivotally connected to the gin breast with pins 30 and the parts being retained in adjusted positions with thumb nuts 31. By this means the gin breast is readily adjustable in relation to the intermediate frame and although the drawings show the gin breast pivotally mounted at the top it will be understood that the gin breast may be pivotally mounted at the lower end, as may be desired.

The position of the intermediate frame is readily adjusted by a screw 32 threaded in a hub 33 on the gin frame and having a hand wheel 34 on the outer end, the opposite end being positioned to engage a lug 35 extended from the intermediate frame.

The bearings 13 by which the intermediate frame 12 is pivotally mounted on the shaft 15 are mounted on the intermediate frame with bolts 36 and 37 which are threaded into a traveler 38 in the intermediate frame and the traveler is adjusted by an elongated screw 39 having a knurled thumb nut 40 on the outer end and a set collar 41 positioned on the inside of an end wall 42 of the intermediate frame. The inner end of the screw 39 is threaded in a web 43 of the traveler 38 and with the bolts 36 and 37 extending through a slot 44 the position of the intermediate frame on the shaft is readily adjustable.

The hinges 11 at the upper end of the intermediate frame are formed with plates 45 secured to the gin breast with screws 46 and the edges of the plates are provided with roll sections or hubs 47 that extend around pins 48 carried by hinge plates 49 which are secured to end plates 50 of the intermediate frame with bolts 51.

The gin breast 10 is provided with ginning ribs 52, under ends 53 of which are secured in the recess 54 of a section 55 of the roll box 56, and the lower ends of which are secured to a spacing block 57 which is secured, such as by welding on the surface of the intermediate frame 12, as shown in Fig. 5.

The shaft 15 on which the saws 57 of the saw cylinder 58 are mounted is rotatably mounted with the bearings 16 on the parts 17 of the sections of the gin frame 18, and serve as a concentric support for mounting the bearings. The bearings, including the bases 13 and caps 14, are positioned around the shaft 15, providing locating means for the intermediate frame which supports the gin breast. As illustrated in Fig. 5, the shaft 15 is mounted in a fixed position on the intermediate frame, and upon adjusting the position of the frame 12 the saws are moved inwardly of the roller part or outwardly therefrom as desired.

The position of the intermediate frame whose rotation changes the angle of the balance of the roll box with relation to the gin frame are set by an index point 25 of the bell crank 23, the point 25 being positioned to coact with a scale 26 on a leg of the frame and the link 19 being pivotally connected to an arm 23 of the bell crank with the pin 22.

By this means the position of the roll box 56 in relation to the saws 57 of the saw cylinder 58 is adjustable and by swinging the intermediate frame about the pivotal mounting the gin breast is caused to rotate whereby the center of the roll box may be moved causing an increase or decrease in the angle of balance, as indicated by the letter X in Fig. 2.

The saws are separated by spacing elements 59 as shown in Fig. 2 and the blast of air is supplied over the saws from an air duct 60 which is in communication with nozzles 61 positioned between flanges 62 and 63 of converging walls 64 and 65 extended from the duct.

Cotton gins of this type are also provided with lint ducts 66 and chutes 67 through which seed drop by gravity. Also, a picker roller 68 and a reclaiming saw 69 may be provided.

The drawings illustrate the application of features of this invention to a cotton gin of the air blast type, however, it will be readily understood that the invention is equally applicable to the brush system of cotton gins of other types.

As illustrated in Fig. 2, the roll box 56 is provided with arcuate sections 55 and 70 which are separated by an opening 71 through which cotton may be supplied to the roll box. On one side of the roll box the ginning ribs 52 are fastened to a piece of material carried by channel 72, and the conventional seed fingers 73 are positioned in the opposite side.

With the parts assembled as illustrated and described the improved structure accomplishes two purposes, first the roll box is adapted to rotate around the saw cylinder to vary the position of the roll of cotton in the roll box in relation to the saws to obtain the most efficient operation; and second, the gin breast with the roll box therein is adapted to move along the face of the intermediate frame 12 by action of adjustable bolt 32 whereby the penetration of the saws into the roll of cotton in the roll box is adjustable, and whereby the gin breast may be actuated in a conventional manner to swing it away from the saws to stop the ginning process.

In Fig. 2 the angle of balance X which is the angle between a vertical plane extended through the axis of the saw cylinder shaft and a plane extended through the saw cylinder shaft and also through the axis of the roll box is, therefore, adapted to be adjusted to compensate for the condition or quality of the cotton being ginned.

It will be understood that modifications, within the scope of the appended claims, may be made in the design and arrangement of the parts without departing from the spirit of the invention.

What is claimed is:

1. A cotton gin comprising a gin frame, a saw cylinder, a shaft upon which the saw cylinder is mounted, an intermediate swinging frame, a gin breast, a roll box carried by the gin breast and positioned to receive saws of the saw cylinder, means for pivotally mounting the intermediate frame on the shaft of the saw cylinder, and means for actuating the gin breast to adjust the position of the roll box in relation to the saw cylinder.

2. A cotton gin comprising a gin frame, a saw cylinder, a shaft upon which the saw cylinder is mounted, an intermediate swinging frame, a gin breast, a roll box carried by the gin breast and positioned to receive saws of the saw cylinder, means for pivotally mounting the intermediate frame on the shaft of the saw cylinder, and means for adjusting the gin breast whereby the roll box is adapted to move on a radius about the axis of the saw cylinder.

3. A cotton gin comprising a gin frame, a saw cylinder, a shaft upon which the saw cylinder is mounted, an intermediate swinging frame, a gin breast, a roll box carried by the gin breast and positioned to receive saws of the saw cylinder, means for pivotally mounting the intermediate frame on the shaft of the saw cylinder, and means for actuating the gin breast whereby the roll box is moved toward and away from the saw cylinder.

4. In a cotton gin, the combination which comprises a gin frame, a saw cylinder rotatably mounted on a shaft in the gin frame, an air duct positioned in the gin frame and having nozzles for projecting air over the saw cylinder, an intermediate frame pivotally mounted on the shaft of the saw cylinder, means for adjusting the position of the intermediate frame in relation to the gin frame, a gin breast adjustably mounted on the intermediate frame, a roll box carried by the gin breast and positioned to receive saws of the saw cylinder, and means for adjusting the position of the gin breast in relation to the gin frame whereby the penetration of saws of the saw cylinder into a roll of cotton in the roll box is adjustable.

5. In a cotton gin, the combination which comprises a gin frame, a saw cylinder rotatably mounted on a shaft in the gin frame, an air duct positioned in the gin frame and having nozzles for projecting air over the saw cylinders, an intermediate frame pivotally mounted on the shaft of the saw cylinder, means for adjusting the position of the intermediate frame in relation to the gin frame, a gin breast adjustably mounted on the intermediate frame, a roll box carried by the gin breast and positioned to receive saws of the saw cylinder, and means for adjusting the position of the gin breast in relation to the gin frame whereby the penetration of saws of the saw cylinder into the roll of cotton in the roll box is adjustable, and also wherein the roll box is adapted to travel on a radius from the center of the saw cylinder.

6. In a cotton gin, the combination which comprises a gin frame having ledges on end sections thereof, a shaft rotatably mounted on the ledges of the gin frame, saws carried by the shaft providing a saw cylinder, an intermediate frame pivotally mounted by bearings thereon on the shaft of the gin frame, said intermediate frame being positioned between the gin breast and gin frame means for adjusting the position of the intermediate frame in relation to the gin frame, a gin breast positioned on the intermediate frame, means for supporting and fastening the breast to the intermediate frame, and a roll box in the gin breast positioned whereby the roll box is adapted to be adjusted on a radius from the axis of the saw cylinder.

References Cited in the file of this patent

UNITED STATES PATENTS

| | | |
|---|---|---|
| 1,988,850 | McLean | Jan. 22, 1935 |
| 2,187,673 | Wallace | Jan. 16, 1940 |
| 2,663,912 | Wallace | Dec. 29, 1953 |